United States Patent

Bailey

Patent Number: 6,009,709
Date of Patent: Jan. 4, 2000

[54] SYSTEM AND METHOD OF CONTROLLING EXHAUST GAS RECIRCULATION

[75] Inventor: Brett M. Bailey, Peoria, Ill.

[73] Assignee: Caterpillar Inc., Peoria, Ill.

[21] Appl. No.: 09/059,485

[22] Filed: Apr. 13, 1998

Related U.S. Application Data

[63] Continuation-in-part of application No. 08/828,685, Mar. 31, 1997, Pat. No. 5,802,846.

[51] Int. Cl.$^7$ .................................................. F02M 25/07
[52] U.S. Cl. .................................... 60/605.2; 123/568.12; 123/568.26
[58] Field of Search .......................... 123/568.11, 568.12, 123/568.17, 568.18, 568.24, 568.26, 568.27, 568.28; 60/599, 605.2

[56] References Cited

U.S. PATENT DOCUMENTS

| | | | |
|---|---|---|---|
| 3,868,868 | 3/1975 | Chana | 477/100 |
| 3,925,989 | 12/1975 | Pustelnik | 60/605.2 |
| 4,388,912 | 6/1983 | Kimura et al. | 123/568.27 |
| 4,426,848 | 1/1984 | Stachowicz | 60/605.2 |
| 4,495,929 | 1/1985 | Maeda et al. | 123/568.28 |
| 4,608,955 | 9/1986 | Ohtaki et al. | 123/406.28 |
| 4,762,109 | 8/1988 | Jeenicke | 123/568.21 |
| 4,956,973 | 9/1990 | Fortnagel et al. | 60/605.2 |
| 5,517,976 | 5/1996 | Bachle et al. | 60/605.2 |
| 5,704,340 | 1/1998 | Togai | 123/568.28 |
| 5,740,785 | 4/1998 | Dickey et al. | 123/568.24 |
| 5,794,445 | 8/1998 | Dungner | 60/605.2 |
| 5,802,846 | 9/1998 | Bailey | 123/568.12 |

*Primary Examiner*—Willis R. Wolfe
*Attorney, Agent, or Firm*—Keith P. Roberson

[57] ABSTRACT

An exhaust gas recirculation (EGR) system for a pressure-charged internal engine for use in a high load condition is presented. The disclosed EGR system includes one or more exhaust combustion chambers attached to a recirculation manifold. A pressure sensor is located in an inlet air manifold. Where the pressure in the inlet manifold is above a predetermined level, a flow control device directs recirculation flow through a supply conduit into the inlet manifold. The disclosed embodiment includes an EGR cooling system where cool air in a bleed conduit connecting an inlet conduit to the exhaust manifold exchanges heat with exhaust gas in the supply. A bleed valve in the bleed conduit moves in response to temperature in the supply duct along with the position of the flow control device to prevent condensation in the combustion chambers. The invention also includes methods for controlling EGR system and EGR cooling system.

16 Claims, 1 Drawing Sheet

SYSTEM AND METHOD OF CONTROLLING EXHAUST GAS RECIRCULATION

This application is a continuation-in part of application Ser. No. 08/828,685, filed on Mar. 31, 1997, now U.S. Pat. No. 5,802,846.

TECHNICAL FIELD

The present invention relates generally to an exhaust gas recirculation system and method and specifically a system and method for controlling of exhaust gas recirculation flow and exhaust gas cooling during a high load and/or high speed condition.

BACKGROUND ART

An Exhaust Gas Recirculation(EGR)system reduces unwanted emissions resulting from the combustion process in an internal combustion engine. When combustion occurs in an environment with an excess of oxygen, peak temperatures in a combustion chamber increases leading to the formation of NOx. The EGR system introduces exhaust gas having a low oxygen concentration into an inlet manifold of the internal combustion engine to lower the concentration of oxygen. By reducing the oxygen concentration, fuel burns slower and reduces peak temperatures in the combustion chamber. Also, the recirculated exhaust gas absorbs some of the heat released during combustion.

Current EGR systems are generally used when an exhaust manifold pressure is greater than the pressure in the inlet manifold. In a pressure charged engine, including turbo charging and super charging as examples, the pressure in the inlet manifold typically increases as the engine load increases. As the pressure in the exhaust manifold approaches the pressure in the inlet manifold, the exhaust gas recirculation flow in a fixed diameter orifice or duct between the inlet manifold and the exhaust manifold decreases. Higher engine speeds and engine loads also generally result in an increase in NOx emissions. Conventional EGR systems provide little, if any, exhaust gas recirculation during times when the engine is producing the most NOx, because the low pressure differential between the exhaust manifold and the inlet manifold prevents sufficient exhaust gas from entering the inlet manifold.

Large truck engines using EGR systems provide an example where no exhaust recirculation may be available at high engine speed and high load. In these applications, the pressure of the air in the inlet manifold can become greater than the average pressure of exhaust gas in the exhaust manifold thereby preventing the use of conventional EGR systems at high loads and speeds.

One way of maintaining a recirculation flow of exhaust gas in a high load, high speed condition is by maintaining a high back pressure in the exhaust manifold. A high back pressure increases the pumping work associated with expelling exhaust gas. The increased pumping work results in a less efficient engine most notably seen by an increase in brake specific fuel consumption.

Instead of maintaining a high back pressure, some control systems use a venturi nozzle to reduce the pressure at a predetermined location in an inlet conduit. An example of this is shown in Henderson U.S. Pat. No. 5,611,203 issued Mar. 18, 1997. Inlet air is throttled through the venturi nozzle where the pressure is reduced in a throat area thereby increasing the pressure differential between the exhaust manifold and the inlet air conduit. An ejector pump is located in an exhaust gas recirculation conduit to further increase the pressure differential and resulting flow of recirculated gas. To achieve any meaningful control, these systems require additional sensors and controls to account for the widely varying pressure differentials between the pressure in the throat and the exhaust manifold.

Another way of managing exhaust gas recirculation at high load, high speed conditions uses a feedback control method that varies an EGR flow control valve based on mass flow rates or other engine parameters. Such feedback control methods require extensive testing and refinement to ensure robustness. A valve located between the exhaust manifold and the inlet manifold provides a variable volume of recirculated exhaust gas during specific operating conditions where the exhaust manifold average pressure is greater than the inlet manifold pressure.

Current methods for controlling exhaust gas recirculation systems may meet emissions standards, but they incur a number of penalties. EGR systems effectively reduce the power density for each charge by limiting the amount of oxygen available for combustion. By limiting power, EGR systems effectively decrease overall performance including increasing break specific fuel consumption. NOx formation increases dramatically as the engine enters the high load operating range, but current EGR systems are not able to operate in high load range conditions. Instead of reducing NOx in a limited range where its production is greatest, current EGR systems operate over the entire engine range excluding the high load condition. The performance penalty of the current EGR systems propagates throughout a larger engine operating range. The present invention is directed at overcoming one or more of the problems set forth above.

DISCLOSURE OF INVENTION

In one aspect of the present invention, a system for controlling exhaust gas recirculation in an internal combustion engine that includes an inlet manifold, an exhaust manifold, a pressurizing device, and a plurality of combustion chambers has at least one of the combustion chambers connected to a recirculation conduit. A pressure sensor connected to the inlet manifold measures an air pressure within the inlet manifold. A flow control device is connected to the recirculation manifold and the inlet manifold. The flow control device has a first position and a second position. In the first position a flow passage allows recirculation gas passage between the recirculation manifold and the inlet manifold. In the second position, the flow control device blocks flow of recirculation gas passage between the recirculation manifold and the inlet manifold. Also, the flow control device is connected to the pressure sensing device. When pressure in the inlet manifold is above a predetermined level the flow control device moves from the second position to the first position.

In another aspect the invention is a method of controlling an exhaust gas recirculation system in an internal combustion engine. The internal combustion engine has an inlet manifold, an exhaust manifold, a recirculation manifold and a plurality of combustion chambers. At least one of the plurality of combustion chambers directs exhaust gas into the recirculation manifold connected to the inlet manifold. A pressure sensor connected to the inlet manifold measures an inlet air pressure. Using the sensed pressure, flow is allowed between the recirculation manifold and the inlet manifold when the inlet pressure is above some predetermined pressure level representing a high load condition.

Other objects and purposes of the invention will be apparent to persons familiar with internal combustion engines upon reading the following specification and inspecting the accompanying drawing.

Figure 1:
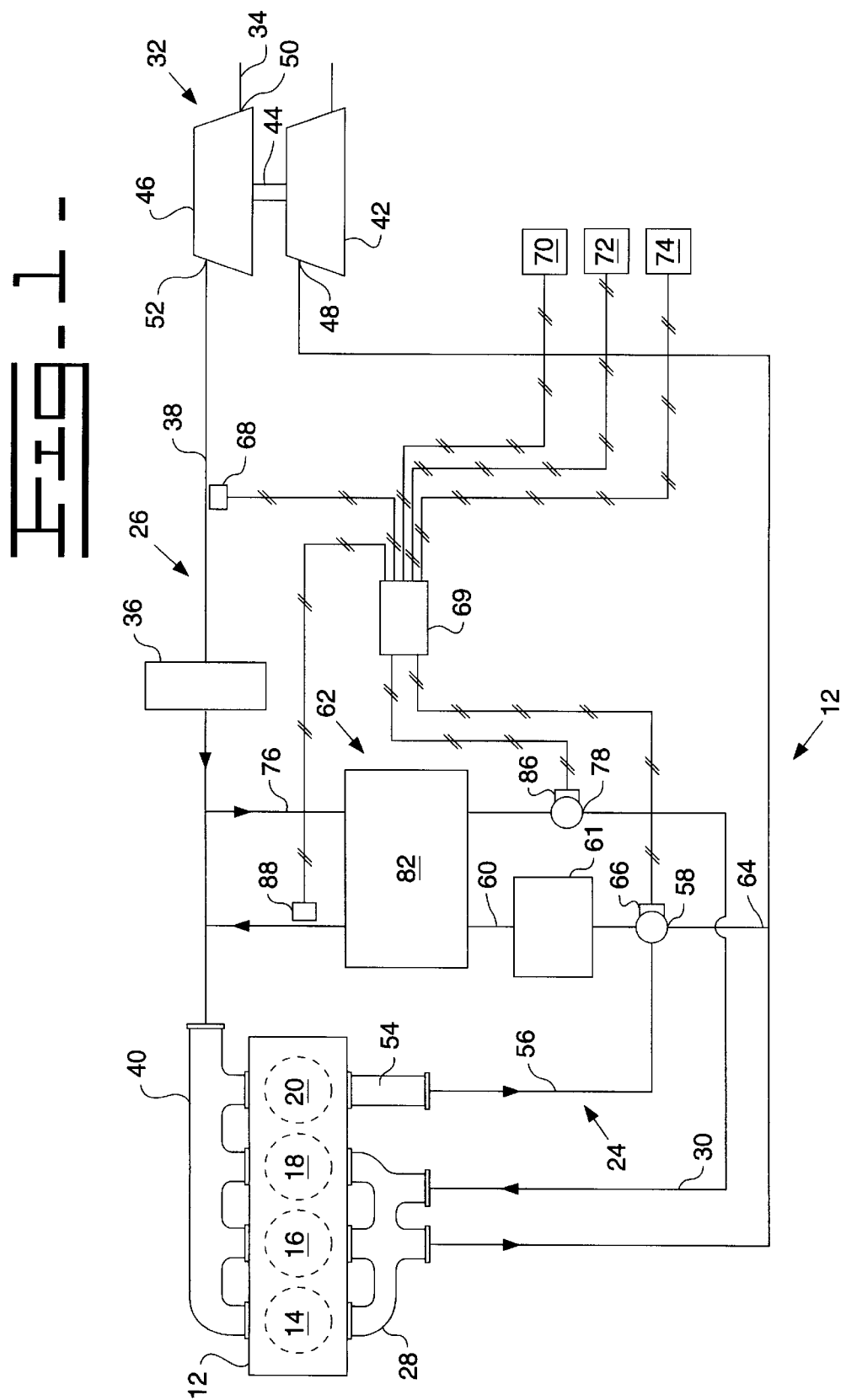
FIG. 1 is a schematic drawing an exhaust gas recirculation system.

Before an embodiment of the invention is explained in detail, it is to be understood that the invention is not limited in its application to the details of construction and the arrangement of components set forth in the following description or illustrated in the drawing. The invention is capable of other embodiments and of being practiced or carried out in various ways. Also, it is to be understood that the terminology used herein is for the purpose of description and should not be regarded as limiting.

BEST MODE FOR CARRYING OUT THE INVENTION

The schematic in FIG. 1 has as its base an internal combustion engine 10. The engine 10 is made up of an engine block 12 having four combustion chambers 14, 16, 18, and 20. While this represents an inline four cylinder engine, this system would work equally well with both an inline or "V" engine having any number of cylinders. In the illustrated embodiment, three combustion chambers 14, 16, and 18 feed exhaust gas into an exhaust system 22 while the final combustion chamber 20 feeds exhaust gas to an EGR system 24. The engine 10 also has an inlet system 26 connected to the combustion chambers 14, 16, 18, and 20.

The illustrated exhaust system 22 has an exhaust manifold 28 and an exhaust conduit 30. Combustion chambers 14, 16, and 18 feed hot exhaust gases into the exhaust manifold 28. The exhaust conduit 30 carries the hot exhaust gases away from the exhaust manifold 28 into a turbocharger 32.

The inlet system 26 provides fresh compressed air to combustion chambers 14, 16, 18, and 20. An ambient air conduit 34 is connected to the turbocharger 32. Compressed air leaving the turbocharger flows through an air-to-air aftercooler 36. The air-to-air aftercooler 36 may be placed anywhere in the inlet system 26 downstream of the turbocharger 32. The compressed air might also be cooled using water or other suitable coolants instead of air depending on the application or available resources. After being cooled, inlet air continues through an inlet conduit 38 to an inlet manifold 40. Combustion chambers 14, 16, 18, and 20 are connected to the inlet manifold 40.

The turbocharger 32 has a turbine 42, shaft 44, and compressor 46. The exhaust conduit 30 connects to a turbine inlet 48. Hot exhaust gas entering the turbine inlet 48 expands causing the turbine 42 to turn. The shaft 44 connected to the turbine 42 also turns. The shaft 44 connects to the compressor 46. The ambient air conduit 34 connects to a compressor inlet 50 and introduces air into the compressor. The shaft 44 turns the compressor 46 and compresses the air. Compressed air exits a compressor outlet 52 connected to the inlet conduit 38.

The EGR system 24 has combustion chamber 20 connected to a recirculation manifold 54. While in this case it is depicted as a separate manifold, the recirculation manifold 54 might be exhaust manifold 28 with a decreased volume in the proximity of combustion chamber 20 and a separate outlet to a recirculation conduit 56. The latter mode reduces the number of parts, cost, and complexity and therefor is the best mode. In either case the volume of the exhaust manifold 28 or recirculation manifold 54 should be configured so that the pressure pulse of the exhaust gas resulting in combustion chamber 20 is not significantly dissipated in the recirculation manifold 54. While this representation-shows only one combustion chamber 20 connected to the recirculation manifold 54, more than one of the combustion chambers 14, 16, 18 and 20 could be connected to the recirculation manifold 54.

The recirculation conduit 56 connects the recirculation manifold 54 to an EGR valve. The EGR valve 58 has a first position where exhaust gas is generally allowed to flow between the recirculation manifold 54 and the inlet manifold 40. In a second position exhaust gas in the recirculation manifold 54 is directed into the exhaust system 22. The EGR valve 58 might also be a positive displacement pump or other similar flow control device. A supply conduit 60 connects the EGR valve 58 with the inlet conduit 38. A particulate trap 61 is located in the supply conduit 60 to protect an EGR cooling system 62 upstream from the particulate trap 61. The present embodiment discloses the supply conduit 60 connected to the inlet conduit 38, but exhaust gas could be introduced in the inlet manifold 40. Also, a bypass conduit 64 connects the EGR valve 58 to the exhaust conduit 30. While the present embodiment shows the bypass conduit connected to the exhaust conduit, the bypass conduit 64 might instead connect to the exhaust manifold.

The EGR valve 58 is connected to an EGR valve actuator 66. The present embodiment shows electronic actuation, but actuation could be through a pneumatic, mechanical, or hydraulic means. In the illustration, a pressure sensor 68 senses pressure in the inlet conduit 38. The pressure sensor 68 provides an input signal to an electronic controller 69. The EGR valve actuator 66 receives an output signal from the electronic controller 69. In addition to the pressure sensor 68, the internal combustion engine 10 may have other sensors providing input signals into the electronic controller 69 including any one or more of the following: an engine speed sensor 70, a fuel demand sensing device 72, and a fuel delivery sensing device 74.

The EGR cooling system 62 in the illustration has a bleed conduit 76, a bleed valve 78, and an EGR heat exchanger or recuperator 82. The bleed conduit 76 is connected to the inlet conduit 38 downstream of the air-to-air aftercooler 36. The bleed conduit 76 passes through a bleed valve 78 into the exhaust manifold 28 preferably in close proximity to the recirculation manifold 54, but the bleed conduit 76 could be connected to the exhaust system 22 anywhere upstream of the turbine inlet 48. The bleed valve 78 has a first bleed position where bleed air is generally allowed to flow between the inlet conduit 38 and the exhaust manifold 28. In a second bleed position air in the inlet conduit prevented from entering the exhaust system 22. The bleed conduit 76 is thermally connected to the EGR recuperator 82. The supply conduit 60 is also thermally connected to the EGR recuperator 82. The bleed valve 78 is connected to a bleed valve actuator 86. The electronic controller 69 sends an output signal to the bleed valve actuator 86. Recirculated exhaust gas might also be cooled using a water jacket, a recuperator, or other cooling similar cooling device. Optionally, a temperature sensor 88 is located in the supply conduit 60 downstream of the EGR recuperator 82 and connects to the electronic controller 69.

Industrial Applicability

The EGR system 24 reduces NOx and particulate matter to within present projected emissions standards while getting full engine performance throughout the entire operating range of the engine 10. The EGR valve 58 is normally in the second position to direct all of the exhaust gas from combustion chambers 14, 16, 18, and 20 into the exhaust conduit 30. Combined exhaust gas from combustion chambers 14, 16, 18, and 20 acts to propel the turbine 42. By diverting all of the exhaust gas into the turbine 42, the turbine efficiency remains high.

An EGR Control Scheme Using Inlet Pressure

In the preferred mode of operation, the engine 10 does not recirculate exhaust gas until reaching a predetermined pressure range. This pressure is an indication of a high load condition. When this condition occurs, the electronic controller 69 sends and output signal to the EGR valve actuator 66 to move the EGR valve 58 from the second position to the first position. The EGR valve 58 may also be configured to start moving at some earlier pressure and to reach the first position after reaching the predetermined pressure.

In the first position, the exhaust gas from combustion chamber 20 moves through the recirculation manifold 54 into the recirculation conduit 44. With proper controls, the EGR valve 58 might divert only some of the exhaust gas into the supply conduit 60 with the remainder of the exhaust gas entering the bypass conduit 64. To prevent fouling of the EGR recuperator 82 and damage to the engine 10, exhaust gas is cleaned by a particulate trap 61. The exhaust gas in the supply conduit 60 is then cooled by exchanging heat with the compressed air in the bleed conduit 76 in an EGR recuperator 82.

With the EGR valve 58 in the first position NOx formation is reduced. The performance of the engine will suffer little, because the engine 10 operating above the predetermined pressure range typically has an excess of oxygen. Exhaust gas from combustion chambers 14, 16, and 18 continues to flow through the exhaust conduit 56 unaffected by the position of the EGR valve 58.

Other advantages are gained by controlling the EGR cooling system 62. The bleed conduit 76 directs the compressed air from the inlet conduit 38 to the exhaust manifold 28. An advantage of controlling the EGR cooling system 62 is that turbine efficiency may be maintained by replacing the hot recirculation gas with compressed air. Initial control of the EGR cooling system is through sensing the inlet pressure. As the pressure approaches the predetermined pressure the electronic controller sends and output signal to bleed valve actuator to move the bleed valve from the second bleed position to the first bleed position.

An EGR Control Scheme Using Pressure and Temperature

Further, using the temperature in the supply conduit 60 along with the pressure sensor allows greater control of the EGR cooling system 62. By adjusting the bleed valve 78 to positions intermediate the first bleed position and the second bleed position, controlled cooling may eliminate condensation entering the combustion chambers 14, 16, 18, and 20. Also, lowering the exhaust gas temperature being recirculated will reduce the overall gas temperature in the combustion chambers 14, 16, 18, and 20 and ultimately reduce NOx formation.

Operating both valves according to the predetermined pressure, both the EGR valve 58 and the bleed valve 78 move to the first position and first bleed position respectively. Compressed air in the bleed conduit 76 is directed to the exhaust manifold 28 to replace the exhaust gas recirculated through the supply conduit 60. This technique eliminates the need for variable geometry turbines needed to maintain efficient operation with varying volumes of exhaust gas. Hot exhaust gas from combustion chamber 20 enters the recirculation manifold 54 at an elevated pressure in the form of a pulse. This high pressure gas is transmitted to the recirculation conduit 56 undissipated through the recirculation manifold. The hot exhaust gas is then directed through the EGR valve 58 into a particulate trap 61. The particulate trap 61 removes many of the particulates that might foul the EGR recuperator 82 or cause damage to the engine 10.

Additionally, the bleed valve may be adjusted to reduce condensation in the engine 10 by reducing the volume of bleed gas flowing into the bleed conduit 76 after the temperature in the supply conduit 56 falls below a predetermined temperature. After sensing a low temperature, the bleed valve 78 adjusts to either slow or stop flow through the bleed conduit 76. Reducing the volume of bleed air slows heat transfer between the exhaust gases in the supply conduit 76 and the bleed air in the bleed conduit. This reduction in cooling allows recirculated exhaust gas in supply conduit 76 to remain above a temperature at which condensation might form.

An EGR Control Scheme Using Pressure and Engine Speed

To decrease the penalties associated with EGR even further, the engine 10 might include the engine speed sensor 70. The EGR valve actuator 66 commands the EGR valve 58 to move from the closed position into the first position when both the pressure exceeds the predetermined pressure range and the engine speed exceeds a predetermined engine speed. Again the exhaust gas from the combustion chamber 20 will take a path via the EGR valve 58 into the inlet conduit 38. The predetermined engine speed coincides with a maximum torque range of the engine 10. The engine speed approaching the maximum torque range of any particular engine varies due to many factors, but may be approximated using limited testing for a particular engine model. Sensing engine speed in connection with the EGR system 24 allows the engine 10 to operate in the maximum torque range without increased fuel consumption while still meeting NOx requirements.

An EGR Control Scheme Using Pressure and Fuel Demand

Another way of reducing the penalty of using EGR is by preventing EGR use during a rapid increase in fuel demanded by the operator. By adding the fuel demand sensing device 72, the EGR valve actuator 66 acts to move the EGR valve 58 from the second position to the first position when the pressure in the inlet manifold 40 is above the predetermined pressure and the sensed change in fuel demand over time is below a predetermined fuel demand rate. A rapidly increasing fuel demand detected by the fuel demand sensing device 72 over time at high boost pressures is indicative of a an acceleration. By preventing the use of exhaust gas recirculation in this scenario more oxygen is available for the required acceleration. This control scheme involves a balancing, but only in a very small operational range. This scheme favors performance and particulate reduction over NOx reduction.

An EGR Control Scheme Using Pressure and Fuel Supplied

Still an additional manner of using EGR in limited scenarios while still meeting emissions standards is to control the position of the EGR valve 58 according to both inlet system 26 pressure and fuel supplied to the combustion chambers 14, 16, 18, 20. By adding the fuel delivery sensing device 74, the EGR valve actuator 66 moves the EGR valve 58 from the second position to the first position only when the engine pressure is above the predetermined pressure range and fuel is delivered to the combustion chambers 14, 16, 18, and 20.

Control of the position of the EGR valve 58 based on fuel delivered is similar to the control scheme based on fuel demand because it is directed at reducing the production of particulates. If no fuel is being delivered and the pressure in the inlet conduit 38 is above the predetermined pressure range, this scheme anticipates that one of two actions will occur. First, the operator anticipates a load reduction. In which case, the EGR valve 58 is place in the second position due to the impending reduction in boost pressure. Second, for some undetermined reason fuel delivery is temporarily interrupted. In which case, the operator will act to reintroduce fuel. In the latter case the reintroduction of fuel will simulate a sudden increase in the fuel demand rate as in the above control scheme which will likely cause particulate formation. This scheme acts to prevent the introduction of exhaust gas during these conditions.

Combining the above control schemes including the use of the pressure sensor 68, engine speed sensor 70, fuel demand sensing device 72, and fuel delivery sensing device 74 restricts EGR usage to the narrowest of scenarios. Mainly, the EGR valve 58 moves from the second position to the first position only when pressure is above the maximum boost pressure range, the engine speed range is above the maximum torque range, fuel demand is not increasing more than some predetermined rate, and fuel is in fact being delivered to the combustion chambers. This control scheme is only one of a combination of control schemes where boost pressure is used with one or a multiple of other parameters to reduce the range in which EGR is used while still meeting emission standards. Any one of these additional control strategies might be added depending on the engine 10, its application, and/or emission standards.

I claim:

1. A system for controlling exhaust gas recirculation in an internal combustion engine, said engine having an inlet manifold, an exhaust manifold, a plurality of combustion chambers, and an air intake pressurizing device being connectable to said inlet manifold, the system comprising:
    a recirculation manifold being connectable to at least one of said plurality of combustion chambers;
    a pressure sensing device being connectable to said inlet manifold, said pressure sensing device measuring an inlet air pressure; and
    a flow control device having a first position and a second position, said flow control device being movable between said first position and said second position, said flow control device being connectable to said recirculation manifold, said inlet manifold and said exhaust manifold, said first position having a flow passage between said recirculation manifold and said inlet manifold, said second position having a flow blockage between said recirculation manifold and said inlet manifold, said flow control device being responsive to said pressure sensing device and being adapted to move from said second position to said first position when the inlet air pressure is above a predetermined level near a maximum boost pressure of said engine, said maximum boost pressure being a function of said engine and being indicative of a high load condition.

2. The system for controlling exhaust gas recirculation as recited in claim 1 further comprising an inlet conduit being connectable between said inlet manifold and said pressure charging device, said pressure sensor being located in said inlet conduit.

3. The system for controlling exhaust as recited in claim 1 further comprising an engine speed sensing device being adapted for measuring an engine speed, said flow control device being responsive with said engine speed sensing device and moving from said second position to said first position where said engine speed is above a predetermined speed.

4. The system for controlling exhaust gas recirculation as recited in claim 3 wherein said predetermined speed is a function of a peak torque of said engine.

5. The system for controlling exhaust gas recirculation as recited in claim 1 further comprising a fuel demand sensing device being adapted to measure a change in fuel demand over time, said exhaust gas flow control device being responsive with said fuel demand sensing device, said flow control device moving from said second position to said first position where said change in fuel demand is below a predetermined fuel demand rate.

6. The system for controlling exhaust gas recirculation in an internal combustion engine as recited in claim 5 wherein said predetermined fuel demand rate indicates a low air fuel ratio acceleration.

7. The system for controlling exhaust gas recirculation as recited in claim 1 further comprising a fuel delivery sensing device being adapted for measuring a fuel supplied to said plurality of combustion chambers; said exhaust gas flow control device being responsive with said fuel delivery sensing device, said flow control device moving from said second position to said first where said fuel supplied exceeds a predetermined fuel delivery requirement.

8. The system for controlling exhaust gas recirculation as recited in claim 7 wherein said fuel delivery sensing device measures a fuel injection duration to determine said fuel supplied to said plurality of combustion chambers.

9. The system for controlling exhaust gas recirculation as recited in claim 1, further comprising:
    an inlet conduit being connectable to said inlet manifold and to said air inlet pressurizing device;
    an aftercooler being connectable to said inlet conduit downstream of said air inlet pressurizing device, said aftercooler reducing the inlet air temperature;
    a bleed conduit being connectable to said exhaust manifold and to said inlet conduit downstream of said aftercooler;
    a supply conduit connecting said recirculation manifold and said inlet manifold;
    an EGR heat exchanger thermally coupling said supply conduit to said bleed conduit;
    a bleed control device being connectable to said bleed conduit, said bleed control device having a first bleed position and a second bleed position, said first bleed position having a flow passage between said inlet conduit; and
    a temperature sensor being connectable to said supply conduit downstream of said EGR heat exchanger, said bleed control device being responsive to said temperature sensor so as to prevent condensation in said engine by moving between said first bleed position and said second bleed position to maintain said EGR heat exchanger at a predetermined temperature range.

10. The system for controlling exhaust gas recirculation as recited in claim 9 further comprising a temperature sensor being connectable to said supply conduit downstream of said EGR heat exchanger and to said electronic controller, said electronic controller manipulating bleed control device to prevent condensation in said engine by moving between said first bleed position and said second bleed position to maintain said EGR heat exchanger at a set temperature.

11. A method for controlling exhaust gas recirculation in an internal combustion engine, said engine having an inlet manifold, an exhaust manifold, and a pressurizing device, the method comprising the steps:

sensing an inlet air pressure in said inlet manifold;

allowing flow between said exhaust manifold and said inlet manifold where said inlet air pressure is above a predetermined pressure level, said predetermined pressure level being near a maximum boost pressure of said engine, said maximum boost pressure being a function of said engine and being indicative of a high load condition.

12. The method for controlling exhaust gas recirculation in an internal combustion engine as recited in claim 11 further comprising the steps:

sensing an engine speed; and allowing flow between said exhaust manifold and said inlet manifold where said engine speed is above a predetermined speed.

13. The method for controlling exhaust gas recirculation in an internal combustion engine as recited in claim 11 further comprising the steps:

sensing a change in fuel demand over time;

allowing flow between said exhaust manifold and said inlet manifold where said change in fuel demand over time is above a predetermined fuel demand rate.

14. The method for controlling exhaust gas recirculation in an internal combustion engine as recited in claim 11 further comprising the steps:

sensing a fuel supplied to said combustion chamber;

allowing flow between said exhaust manifold and said inlet manifold where said fuel supplied to said combustion chambers is above a predetermined fuel delivery requirement.

15. A method for controlling exhaust gas recirculation cooling in an internal combustion engine, said engine having an inlet manifold, an exhaust manifold, a supply conduit, a pressurizing device, a temperature sensor, and a recirculation cooling system, said exhaust manifold being connectable to said inlet manifold by said supply conduit, said exhaust gas recirculation cooling system having a bleed conduit, bleed valve, and EGR heat exchanger, the method comprising the steps:

sensing an inlet air pressure in an inlet manifold, said inlet manifold being connectable to a combustion chamber;

allowing flow between an exhaust manifold and said inlet manifold through a supply conduit where said inlet air pressure is above a predetermined pressure level; and cooling supply conduit where said flow control device is allowing fluid flow between said exhaust manifold and said inlet manifold, said cooling provided by using a cooled inlet air stream.

16. The method for controlling exhaust gas recirculation cooling in an internal combustion engine as recited in claim 15 further comprising the steps:

sensing a gas temperature in said supply conduit downstream of said recirculation cooling system;

controlling cooling to maintain a predetermined temperature in said supply conduit.

* * * * *